United States Patent
Hopkins (10) Patent No.: US 9,488,273 B2
(45) Date of Patent: Nov. 8, 2016

(54) NEUTRAL LOCKING SYSTEM, TOOL AND METHOD FOR A VEHICLE

(71) Applicant: Honda Motor Co., Ltd., Tokyo (JP)

(72) Inventor: Marcus E. Hopkins, East Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 14/074,674

(22) Filed: Nov. 7, 2013

(65) Prior Publication Data

US 2015/0122068 A1    May 7, 2015

(51) Int. Cl.
*B60K 20/00* (2006.01)
*F16H 63/34* (2006.01)

(52) U.S. Cl.
CPC ...... *F16H 63/3491* (2013.01); *Y10T 74/20104* (2015.01)

(58) Field of Classification Search
CPC .......... F16H 63/3416; F16H 63/3408; F16H 63/36; F16H 2063/3079; F16H 2063/3083
USPC ............. 81/177.2, 177.1, 120, 121.1, 124.6, 81/124.7, 13, 155, 488; 74/473.11, 74/473.15, 473.21, 473.23, 473.2, 47.33, 74/473.36, 473.37, 335, 336 R; 192/219.5, 192/219.6
See application file for complete search history.

(56) References Cited

U.S. PATENT DOCUMENTS

| | | | | |
|---|---|---|---|---|
| 3,161,093 A | * | 12/1964 | Hoag | B25B 13/06 74/544 |
| 4,480,511 A | * | 11/1984 | Nickipuck | B25B 23/0035 403/325 |
| 4,531,422 A | * | 7/1985 | Yarnell | F16H 61/16 74/346 |
| 4,779,477 A | * | 10/1988 | Horton | F16H 59/02 74/473.11 |
| 4,998,444 A | * | 3/1991 | Mabee | F16H 59/12 74/335 |
| 5,197,356 A | * | 3/1993 | Kobayashi | B60R 25/02144 477/99 |
| 5,220,985 A | * | 6/1993 | Annis | B60T 1/005 192/219.5 |
| 5,478,003 A | * | 12/1995 | Green | A61B 17/07207 227/176.1 |
| 5,588,330 A | * | 12/1996 | Kataumi | F16H 59/10 192/219.6 |
| 5,647,818 A | * | 7/1997 | Moody | F16H 61/22 192/222 |
| 5,797,295 A | * | 8/1998 | Kataumi | F16H 59/10 192/220.3 |
| 5,881,853 A | * | 3/1999 | Peuster | F16D 28/00 192/3.56 |

(Continued)

*Primary Examiner* — William Kelleher
*Assistant Examiner* — Zakaria Elahmadi
(74) *Attorney, Agent, or Firm* — Rankin, Hill & Clark LLP (57) ABSTRACT

A neutral locking system and method for a vehicle includes a park release shaft and a neutral locking tool. The park release shaft is operatively connected to a transmission of the vehicle such that rotation of the park release shaft in a first rotatable direction places the transmission in a neutral state. The neutral locking includes a fixture element and a rotatable element rotatably received within the fixture element. The rotatable element has one end configured to nonrotatably and removably couple to the park release shaft such that rotation of the rotatable element within the fixture element rotates the park release shaft.

18 Claims, 10 Drawing Sheets

(56) References Cited

U.S. PATENT DOCUMENTS

| | | | |
|---|---|---|---|
| 5,924,540 A * | 7/1999 | Kim | F16H 59/10 |
| | | | 192/220.4 |
| 5,938,562 A * | 8/1999 | Withey | F16H 59/10 |
| | | | 192/220.3 |
| 6,286,396 B1 * | 9/2001 | Johnson | B25B 9/00 |
| | | | 81/177.2 |
| 6,341,544 B1 * | 1/2002 | Falzone | B25B 13/44 |
| | | | 81/128 |
| 6,679,361 B2 * | 1/2004 | Ahnert | B60K 23/02 |
| | | | 192/3.56 |
| 6,972,115 B1 * | 12/2005 | Ballard | B01J 19/088 |
| | | | 422/186.04 |
| 7,278,341 B1 * | 10/2007 | Novin | B25B 13/065 |
| | | | 411/428 |
| 7,516,822 B2 * | 4/2009 | Kramer | B60T 7/107 |
| | | | 188/156 |
| 7,677,140 B2 * | 3/2010 | Hull | B25B 13/461 |
| | | | 16/429 |
| 2006/0016287 A1 * | 1/2006 | Grossman | F16H 59/0204 |
| | | | 74/473.21 |
| 2007/0144295 A1 * | 6/2007 | Otashiro | B60R 25/066 |
| | | | 74/473.21 |
| 2009/0241718 A1 * | 10/2009 | Jeong | F16H 59/10 |
| | | | 74/483 R |
| 2014/0116835 A1 * | 5/2014 | Heuver | F16H 63/3416 |
| | | | 192/219.5 |

* cited by examiner

NEUTRAL LOCKING SYSTEM, TOOL AND METHOD FOR A VEHICLE

BACKGROUND

Vehicle transmissions sometimes must be put into a neutral state in order for various service operations to be performed on the vehicle. In a manual transmission, this can be as simple as moving the manual shift lever to the neutral position. In one known manual transmission, a locking mechanism is provided for engaging the manual shift lever and holding or locking the shift lever in the neutral position so as to prevent the shift lever from inadvertently moving out of the neutral position. In automatic transmissions, a particular method and/or arrangement may be needed for the particular transmission that is to be placed into the neutral state.

SUMMARY

According to one aspect, a neutral locking system for a vehicle includes a park release shaft operatively connected to a transmission of the vehicle such that rotation of the park release shaft in a first rotatable direction places the transmission in a neutral state. The park release shaft is located adjacent an aperture of a transmission case housing the transmission. The neutral locking system further includes a neutral locking tool for rotating the park release shaft. The neutral locking tool includes a fixture element for positioning over the aperture of the transmission case and a rotatable element rotatably received within the fixture element and having one end configured to nonrotatably and removably couple to the park release shaft such that rotation of the rotatable element within the fixture element rotates the park release shaft.

According to another aspect, a neutral locking method is provided for rotating a transmission park release shaft of a vehicle to place a transmission of the vehicle in a neutral state. In the method, a neutral locking tool is provided that has a fixture element for positioning over an aperture of a transmission case of the transmission and a rotatable element rotatably received within the fixture element. One end of the rotatable element is nonrotatably and removably coupled to the park release shaft such that rotation of the rotatable element within the fixture element rotates the park release shaft.

According to a further aspect, a neutral locking tool for a vehicle includes a fixture element and a rotatable element. The fixture element is for positioning over an aperture of a transmission case adjacent which a park release shaft is located that is operatively connected to a vehicle transmission for placing the transmission in a neutral state upon rotation thereof. The rotatable element is rotatably received within the fixture element and has one end configured to nonrotatably and removably couple with the park release shaft such that rotation of the rotatable element within the fixture element rotates the park release shaft.

DETAILED DESCRIPTION

Referring now to the drawings wherein the showings are for purposes of illustrating one or more exemplary embodiments and not for purposes of limiting the same, FIGS. 1-6 illustrate a neutral locking system 10 for a vehicle 12 that includes a neutral locking tool 14 for rotating a park release shaft 16 of the vehicle 12. As will be described in more detail below, the park release shaft 16 is operatively coupled or connected to a transmission 18 of the vehicle 12 such that rotation of the park release shaft 16 places the transmission 18 in a neutral state. The transmission 18 in such a neutral state can allow for various service operations to be performed on the vehicle 12.

More particularly, in the illustrated embodiment, a transmission case 20 houses the transmission 18 of the vehicle 12. As shown, the transmission case 20 can have an aperture 22 defined therein with the park release shaft 16 located adjacent the aperture 22 (e.g., extending through the aperture 22) such that the park release shaft 16 is accessible. The park release shaft 16 is operatively connected to the transmission 18 such that rotation of the park release shaft 16 in a first rotatable direction (i.e., counter clockwise in FIG. 6) places the transmission 18 into the neutral state. In the illustrated embodiment, a polygonal-shaped portion or protuberance 24 in the shape of a block member is positioned on, or extends or protrudes upward from, the transmission case 20, and more specifically on/from a top wall or upper side 20a of the transmission case 20. The aperture 22 is specifically defined in or by the protuberance 24 with an open end 22a of the aperture 22 defined in an upper surface 24a of the protuberance 24.

Figure 11:
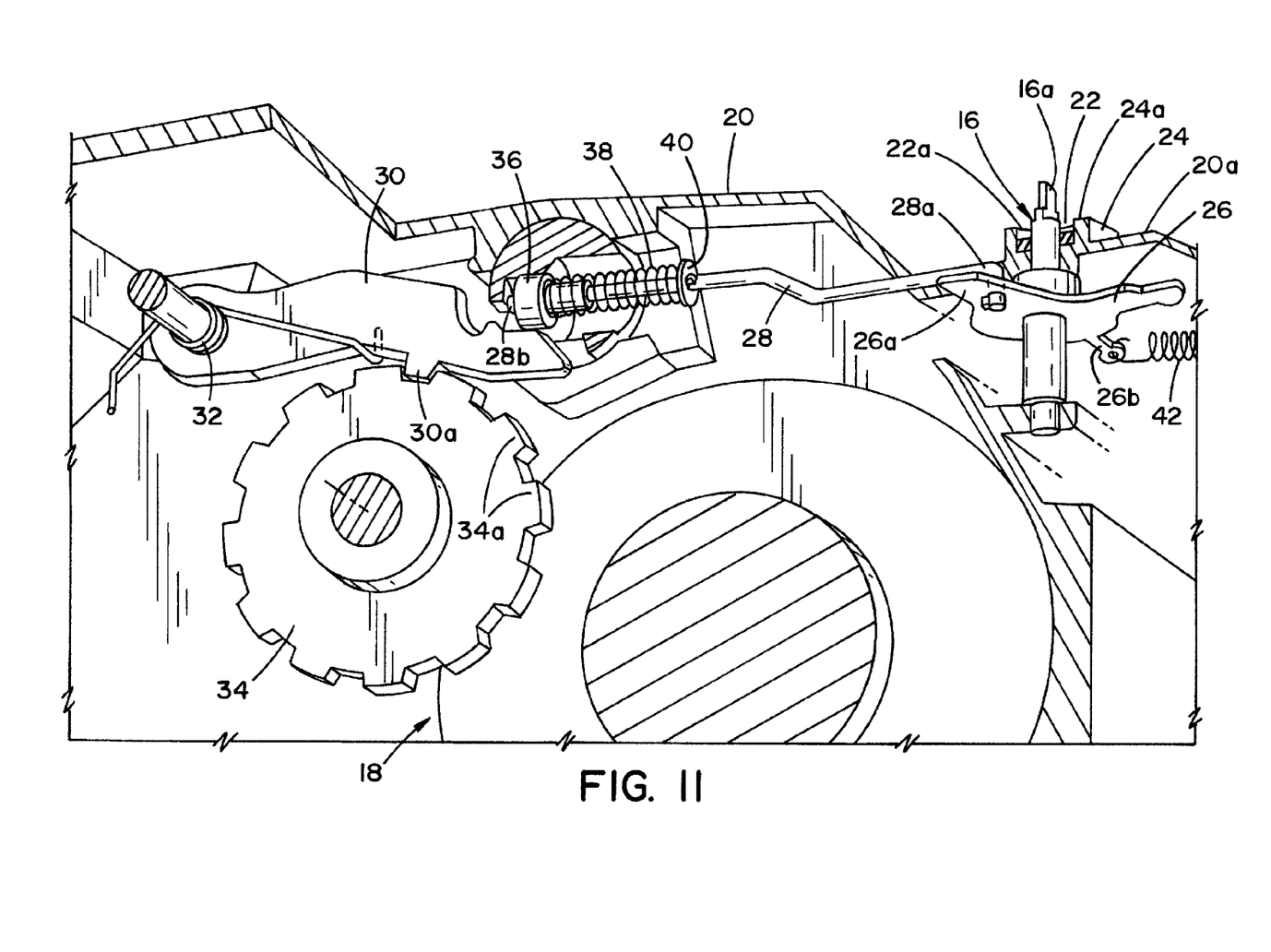
FIG. 11 is a perspective view, partially in cross-section, of a park release structure associated with the transmission showing the transmission in an engaged state (not a neutral state).
Figure 12:
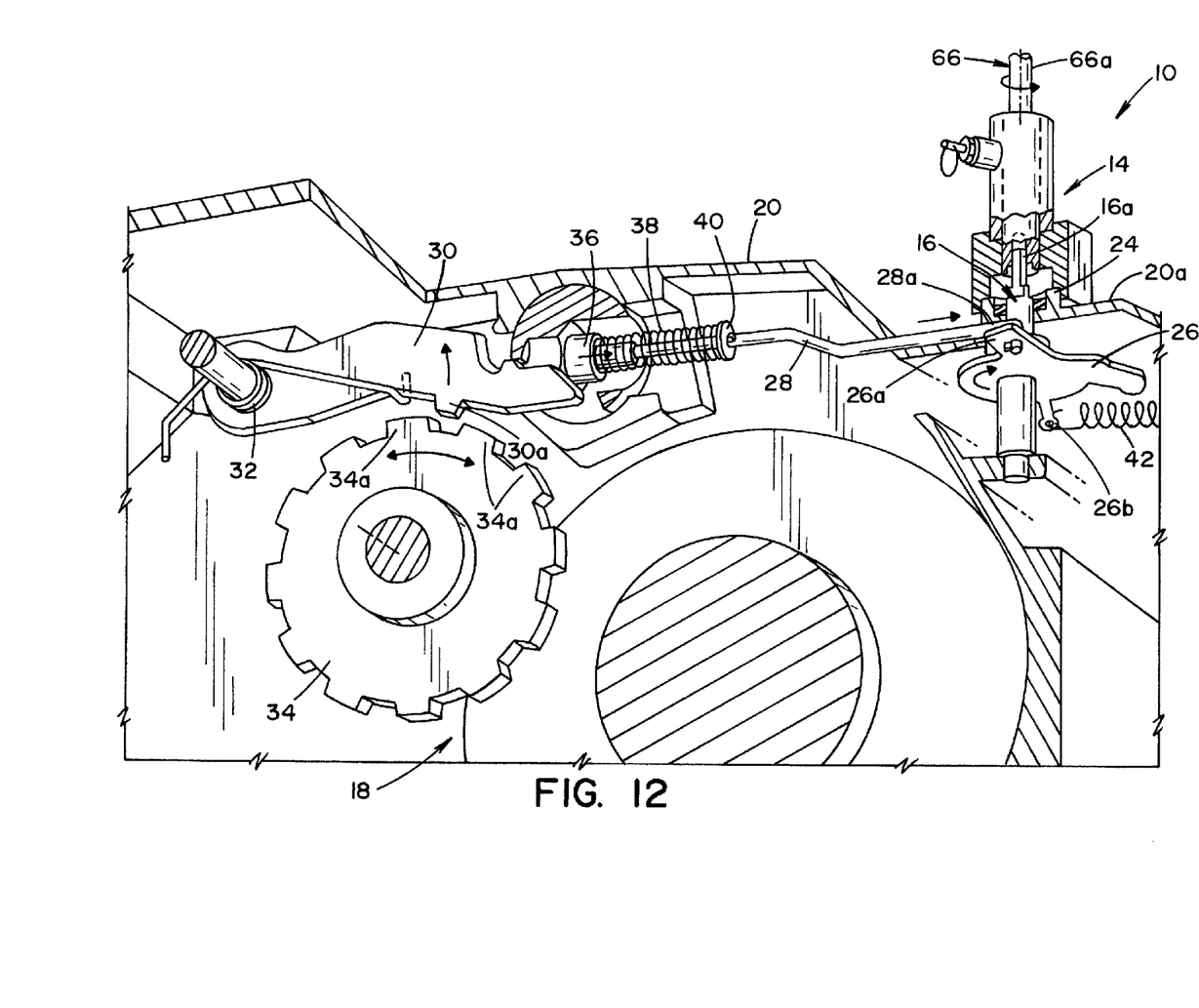
FIG. 12 is a perspective view similar to FIG. 11, but showing the transmission in the neutral state.
Figure 13:
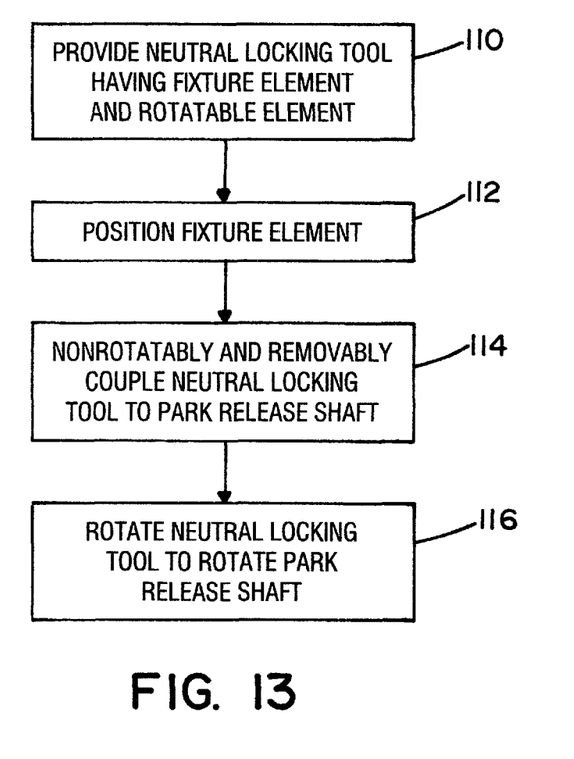
FIG. 13 is a process flow diagram illustrating a neutral locking method for a transmission of a vehicle.

With brief additional reference to FIGS. 11 and 12, the park release shaft 16 is shown inside the transmission case 20. In the illustrated embodiment, a plate member 26 is fixably secured to the park release shaft 16 inside the transmission case 20 such that rotation of the park release shaft 16 causes rotation of the plate member 26. As shown, the plate member 26 can be specifically arranged such that a vertical axis of the park release shaft 16 defined by a longitudinal or axial extent of the park release shaft 16 is orthogonally oriented relative to a plane in which the plate member 26 resides. The plate member 26 has an arm portion 26a to which a proximal end 28a of a park release rod 28 is connected. A distal end 28b of the park release rod 28 normally urges and/or maintains a parking pawl 30 in an engaged position (FIG. 11) against the biasing of a parking pawl spring 32 wherein a tooth 30a of the parking pawl 30 meshes with gear teeth 34a of a parking gear 34 of the transmission 18. This position can correspond to the transmission 18 being in a park state (and/or can correspond to an engine of the vehicle 12 being off) and functions to limit vehicle movement.

In the illustrated embodiment, the distal end 28b includes an engaging member 36 slidably disposed on the park release rod 28 for engaging the parking pawl 30 which, in turn, causes the tooth 30a to engage and/or mesh with the parking gear teeth 34a. The engaging member 36 is urged away from the proximal end 28a by a coil spring 38 arranged between the engaging member 36 and a washer member 40 arranged on the park release rod 28 between the proximal and distal ends 28a, 28b. The sliding arrangement of the engaging member 36 on the park release rod 28 allows for smoother cooperation between the park release rod 28 and the parking pawl 30, particularly when the tooth 30a of the parking pawl 30 is not precisely aligned between two adjacent ones of the gear teeth 34a of the parking gear 34. A spring 42 can be connected to an arm portion 26b of the plate member 26 for biasing the plate member 26 and thereby the park release shaft 16 in a second rotatable direction (a rotatable direction opposite the first rotatable direction).

When the park release shaft 16 is rotated in the first rotatable direction, as shown in FIG. 12, the plate member 26 likewise rotates and causes the park release rod 28 to move away from the parking pawl 30. This in turn causes the engaging member 36 to pull away from the parking pawl 30 thereby allowing the parking pawl spring 32 to rotate the parking pawl 30 out of meshing engagement with the parking gear 34. This disengages the parking gear 34. Accordingly, the parking gear 34 is then free to rotate and the transmission is placed in a neutral state.

Returning reference to FIGS. 1-6, the neutral locking tool 14 of the illustrated embodiment includes a fixture element 50 for positioning over the aperture 22 of the transmission case 20 and a rotatable element 52 rotatably received within the fixture element 50. The rotatable element 52 has one end (i.e., lower end 52a) configured to nonrotatably and removably couple to the park release shaft 16 such that rotation of the rotatable element 52 within the fixture element 50 rotates the park release shaft 16. The rotatable element 52 is rotatably movable within the fixture element 50 between a first rotatable element position corresponding to the park release shaft being a non-neutral position and a second rotatable element position corresponding to the park release shaft being in a neutral position. As will be describe in more detail below, the neutral locking tool can include one or both of a rotation limiting feature and a rotation locking feature.

Figure 9:
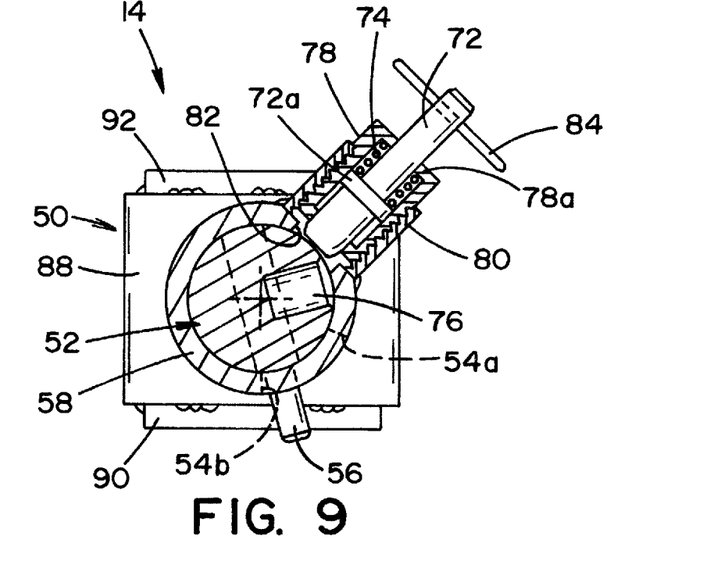
FIG. 9 is a cross-section view taken along the line 9-9 of FIG. 7.
Figure 10:
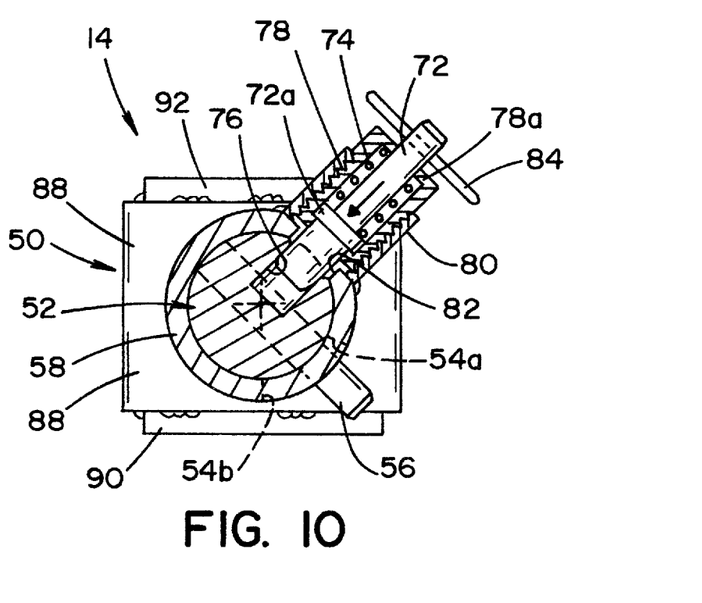
FIG. 10 is a cross-section view taken along the line 10-10 of FIG. 8.

As concerns the rotation limiting feature, the fixture element 50 and the rotatable element 52 can be configured such that cooperative engagement between the rotatable element 52 and the fixture element 50 can limit a degree of rotation of the rotatable element 52 relative to the fixture element 50. Also, the fixture element 50 and the rotatable element 52 can be configured such that cooperative engagement therebetween can limit axial movement of the elements 50, 52 relative to one another. More particularly, in the illustrated embodiment, the cooperative engagement between the rotatable element 52 and the fixture element 50 limits rotation of the rotatable element 52 between the first rotatable element position (shown in FIGS. 7 and 9) corresponding to the park release shaft 16 being in a normal, non-neutral position and a second rotatable element position (shown in FIGS. 8 and 10) corresponding to the park release shaft 16 being in a neutral position. In particular, one of the fixture element 50 and the rotatable element 52 can define a circumferentially elongated slot (e.g., circumferentially elongated slot 54) and the other of the fixture element 50 and the rotatable element 52 can include a fixedly secured pin (e.g., fixedly secured pin 56), wherein the pin is received in the circumferentially elongated slot to limit rotation of the rotatable element 52 relative to the fixture element 50.

More specifically, and particular to the illustrated embodiment, the fixture element 50 can define the circumferentially elongated slot 54 in a cylindrical sleeve portion 58 and the rotatable element 52, which can be cylinder-shaped and received within the cylindrical sleeve portion 58, can include the fixedly secured pin 56. As shown, the rotatable element 52 of the illustrated embodiment is received in the cylindrical sleeve portion 58 with a radial extent of the rotation of the rotatable element 52 relative to the fixture element 50 limited by the circumferentially elongated slot 54. That is, rotation of the rotatable element 52 causes rotation of the fixedly secured pin 56 within the circumferentially elongated slot 54. Elongated ends 54a, 54b of the slot 54 define limit stops for the pin 56 and thus for rotation of the rotatable element 52 within the fixture element 50. The pin 56 in contact with the end 54a of the slot 54 can correspond to the rotatable element 52 being in the first rotatable element position and the pin 56 in contact with the end 54b of the slot 54 can correspond to the rotatable element 54 being in the second rotatable element position. The pin 56 in the slot 54 also fixes the axial position of the rotatable element 52 and the fixture element 50 relative to one another (i.e., the elements 50, 52 cannot move axially relative to one another).

In the illustrated embodiment, and with further reference to FIGS. 7-10, the park release shaft 16 is a stub shaft that protrudes only slightly from the transmission case 20, and particularly from the protuberance 24 of the transmission case 20. The park release shaft 16 can be disposed such that its upper end is vertically spaced apart from an upper end of an engine compartment 60. The park release shaft 16 of the illustrated embodiment has a keyed configuration that can be cooperatively engaged by the lower end 52a of the rotatable element 52 for rotation of the park release shaft 16. In particular, the park release shaft 16 can have a keyed portion 16a and the rotatable element 52 can include a mating slot 62 adjacent the lower end 52a, which can also be referred to as a lower axial end, wherein the key portion 16a is configured for cooperative axial receipt within the mating slot 62. Thus, the keyed portion 16a of the park release shaft 16 can cooperatively fit within the mating slot 62 defined in the lower end 52a of the rotatable element 52.

As shown, the mating slot 62 can be formed by a diametrically extending cross slot drilled through the rotatable element 52. Optionally, and as included in the illustrated embodiment, a counterbore portion 68 can be disposed below the mating slot 62. While in the illustrated embodiment, the mating slot 62 is shown centrally located on the rotatable element 52 and likewise the keyed portion 16a is centrally provided on the park release shaft 16, it is to be understood and appreciated by those skilled in the art that other arrangements could be employed (e.g., the keyed portion 16a and the mating slot 62 could be eccentrically located). Moreover, the precise cooperative axial engagement between the rotatable element 52 and the park release shaft 16 can vary from what is shown in the illustrated embodiment as the cooperative engagement need only transfer rotation of the rotatable element 52 to rotation of the park release shaft 16.

Figure 7:
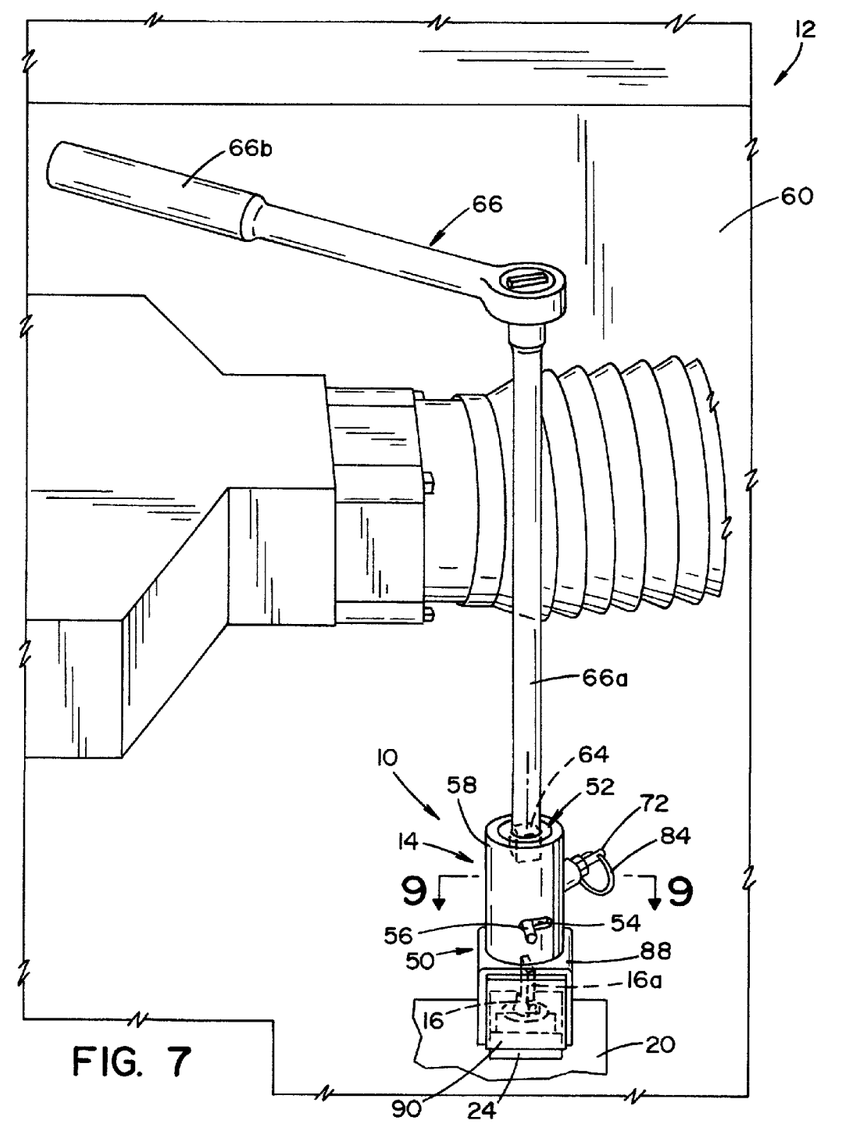
FIG. 7 is a partial perspective view of a neutral locking system showing the neutral locking tool and the park release shaft disposed within an engine compartment, and further showing a ratchet tool removably secured to the neutral locking tool for rotating the park release shaft via the neutral locking tool.
Figure 8:
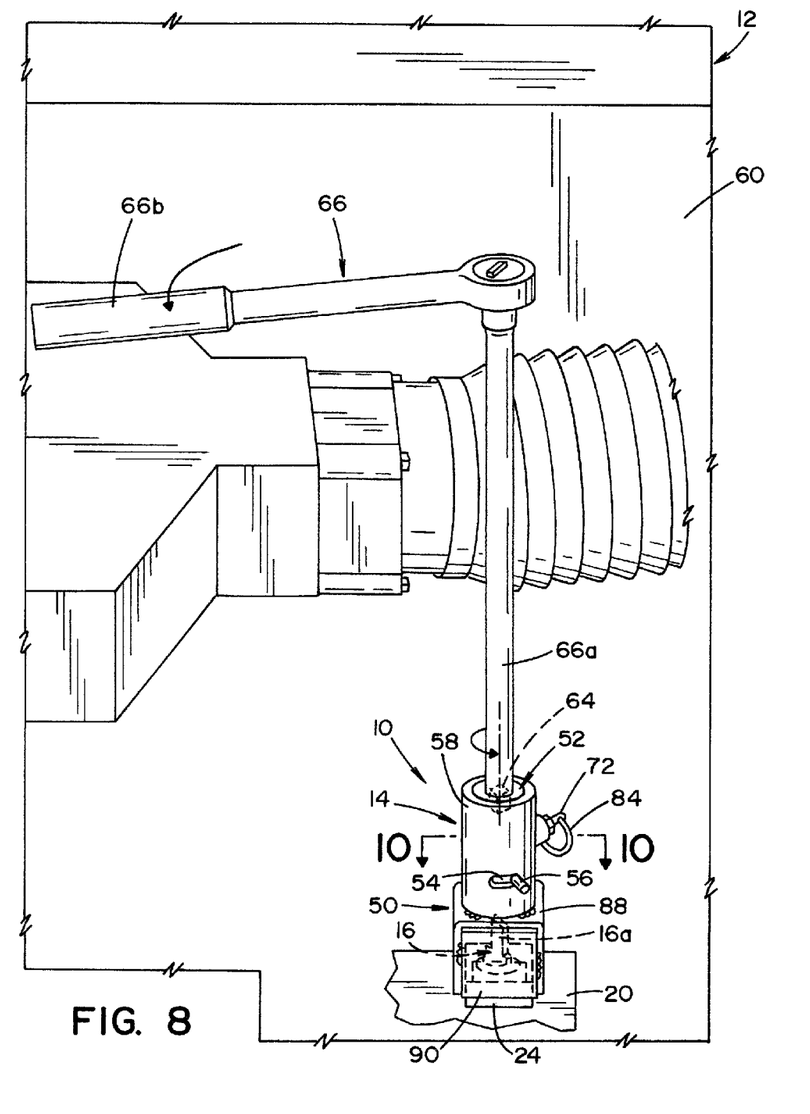
FIG. 8 is another partial perspective view, similar to FIG. 7, but showing the ratchet tool rotated to rotate a rotatable element of the neutral locking tool, which thereby rotates the park release shaft to place the transmission in a neutral state.

As shown, the rotatable element 52 can additionally include a tool slot 64 adjacent an upper end 52b thereof, which can be referred to as an upper axial end, for receipt of a rotating tool 66 configured to rotate the rotatable element 52 and thereby the park release shaft 16. The rotating tool 66 can be a ratchet that includes an elongated engaging shaft 66a to facilitate the lower end thereof reaching the tool slot 64 on the rotatable element 52, which is disposed adjacent the park release shaft 16, particularly in environments where the park release shaft 16 projects a minimal amount from the transmission case 20 (e.g., as shown in FIGS. 7 and 8) and/or where the park release shaft 16 is disposed deep or low into the engine compartment 60 of the vehicle 12 causing the park release shaft 16 to be relatively inaccessible. The rotating tool 66 can include a handle 66b for providing leveraged rotation or turning on the rotatable element 52. This can assist in rotating the park release shaft 16 in the first rotatable direction since such rotation is against the urging of the park release shaft 16 in the second rotatable direction. While the rotating tool 66 is shown as a ratchet in the illustrated embodiment, it is to be appreciated that other rotating tools could be used (e.g., a T-handle, etc.).

As concerns the rotation locking feature, the neutral locking tool 14 can further include a plunger element 72 disposed on the fixture element 50. The plunger element 72 can be radially movable between a retracted position (shown in FIG. 9) wherein relative rotation of the rotatable element 52 is allowed, at least within the extent permitted by the slot 54, and a locking position (shown in FIG. 10) wherein the plunger element 72 inhibits relative rotation of the rotatable element 52. A spring 74 can urge the plunger element 72 toward the locking position wherein the plunger element 72 inserts into the rotatable element 52 to limit rotation of the rotatable element 52 relative to the fixture element 50. In the illustrated embodiment, the rotatable element 52 includes an aperture 76 into which the plunger element 72 is received when the plunger element 72 is in the locking position and the rotatable element 52 is rotated to thereby rotate the park release shaft 16 and place the transmission in the neutral state.

In the illustrated embodiment, the plunger element 72 includes a flange portion 72a and is axially disposed within a threaded member 78. The spring 74 is axially interposed between the flange portion 72a and one end 78a of the threaded member 78. The threaded member 78 is threadedly secured to a sleeve portion 80 protruding radially from the cylindrical sleeve portion 58 at the location of an aperture 82 defined in the cylindrical sleeve portion 58. The plunger element 72 can include a ring member 84 for pulling the plunger element 72 radially outwardly toward the retracted position against the urging of the spring 74 when desired (e.g., when desired to remove the plunger element 72 from the aperture 76 of the rotatable element 52). When the rotatable element 52 is first removably and nonrotatably coupled to the park release shaft 16 wherein the rotatable element 52 is in the first rotatable element position shown in FIG. 9, the plunger element 72 engages the rotatable element 52 via the urging of the spring 74 but only about a circumferential surface of the rotatable element 52. Once the rotatable element 52 is rotated (e.g., approximately 20 degrees), the aperture 76 is aligned with the aperture 82 and the spring 74 can forcibly move the plunger element 72 so that the plunger element 72 inserts into the aperture 76 of the rotatable element 52 to thereby lock the rotatable position of the rotatable element 52 relative to the fixture element 50.

Figure 1:
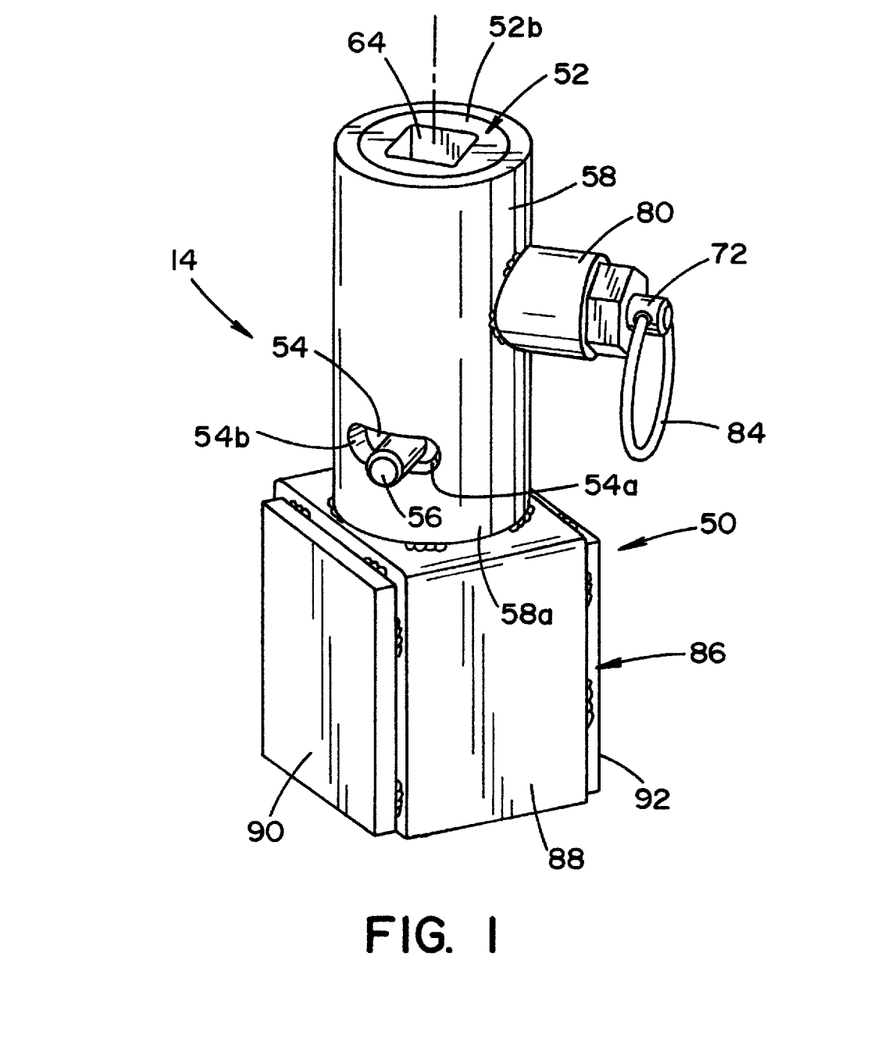
FIG. 1 is a perspective view of a neutral locking tool according to one exemplary embodiment.
Figure 2:
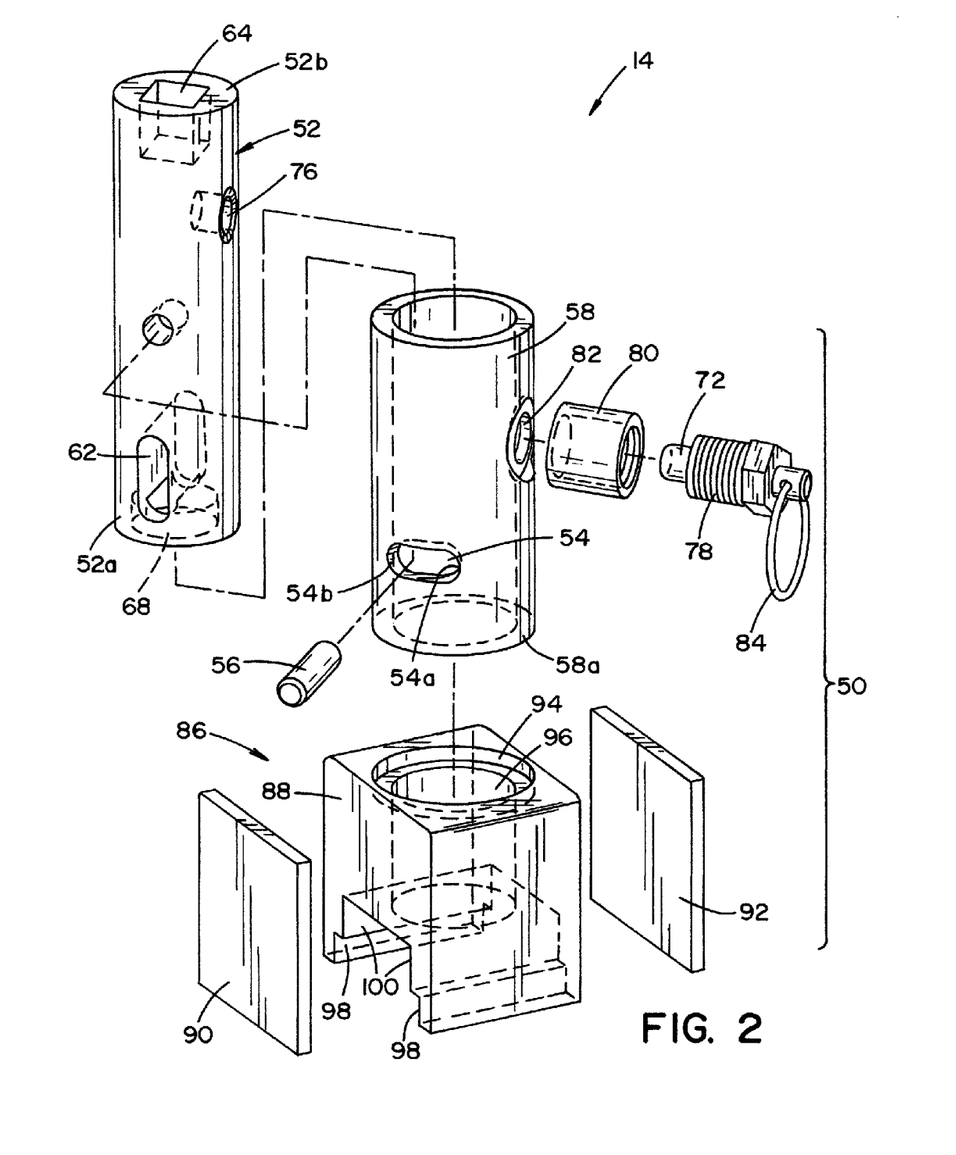
FIG. 2 is an exploded perspective view of the neutral locking tool of FIG. 1.
Figure 3:
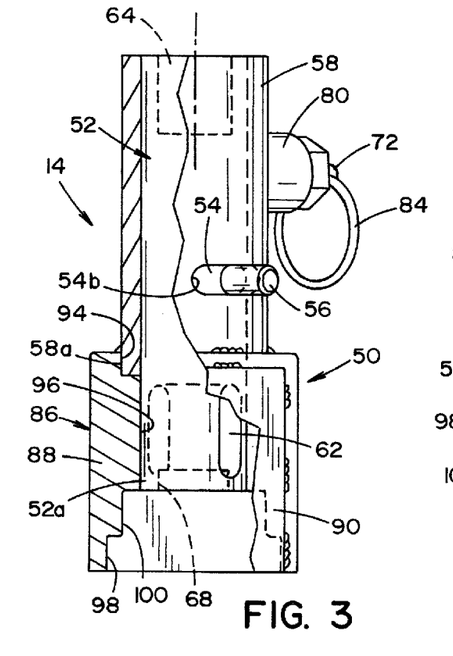
FIG. 3 is a side elevation view, partially in cross-section, of the neutral locking tool of FIG. 1.
Figure 4:
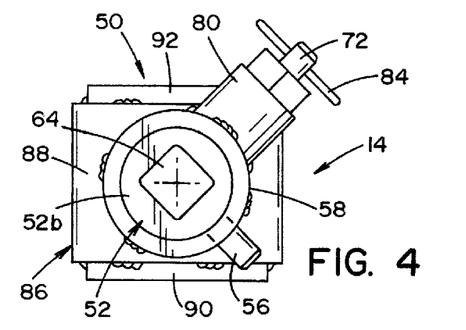
FIG. 4 is a top plan view of the neutral locking tool of FIG. 1.
Figure 5:
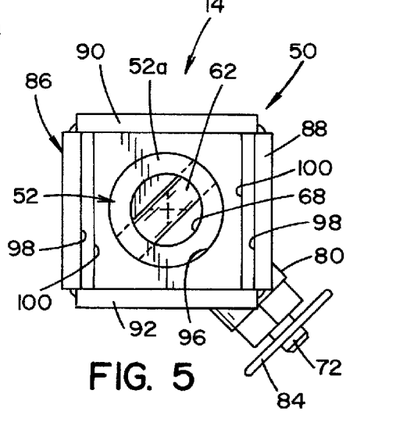
FIG. 5 is an underside plan view of the neutral locking tool of FIG. 1.
Figure 6:
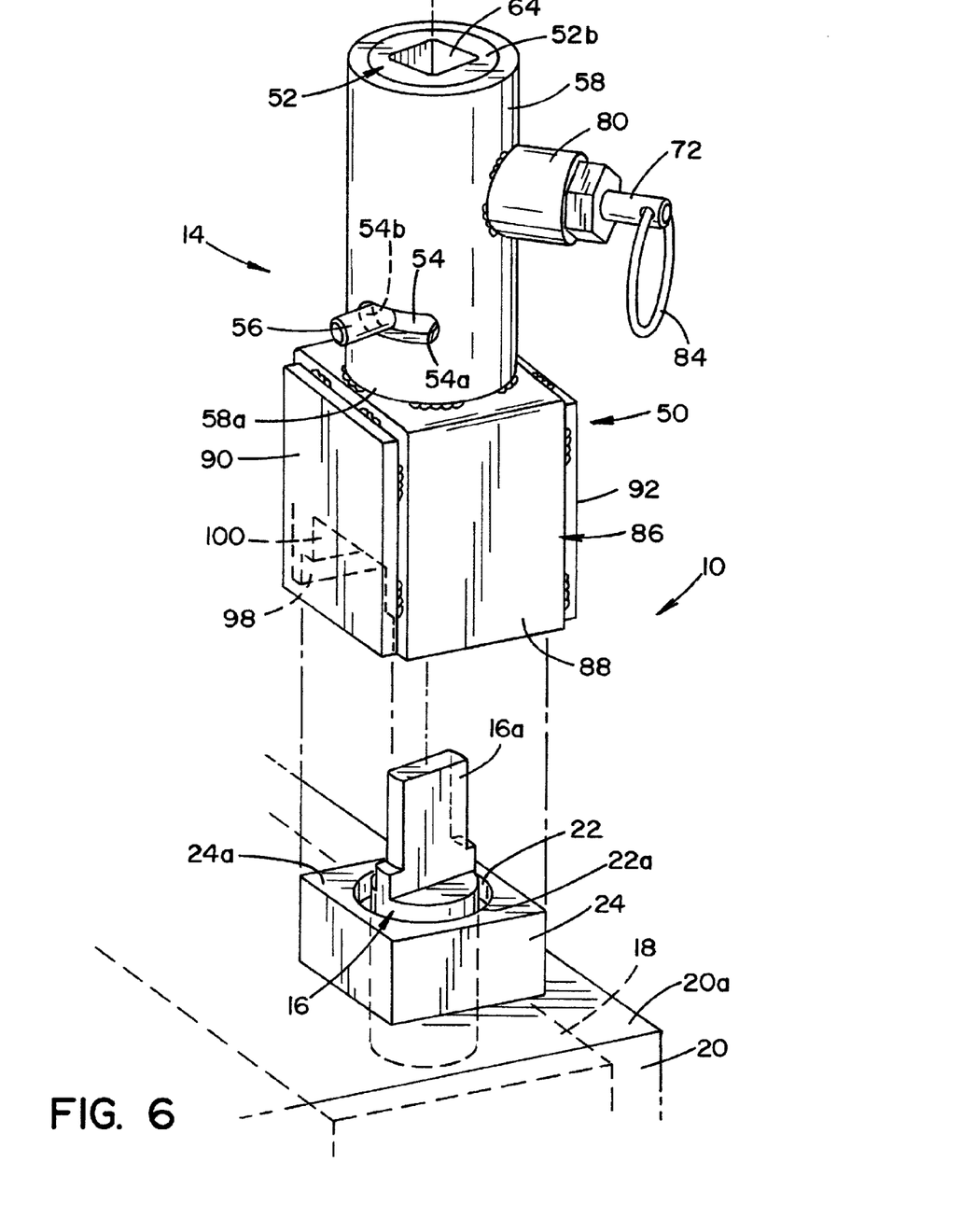
FIG. 6 is a partial perspective view of a neutral locking system including park release shaft of a vehicle transmission and the neutral locking tool of FIGS. 1-5 for removably coupling and rotating the park release shaft.

The fixture element 50 can additionally have a lower end portion 86 configured to complementarily fit over and couple with the protuberance 24 to axially align the rotatable element 52 with the park release shaft 16. In the illustrated embodiment, the lower end portion 86 includes a main body 88 and plate members 90, 92 secured to lateral sides of the main body 88. The main body 88 can include a counterbore 94 shaped and sized to complementarily fit a lower end 58a of the cylindrical sleeve portion 58. These parts 58, 88 can be welded together as shown in FIG. 1. A throughole 96 can be defined through the main body 88 for partially receiving the rotatable element 52, particularly the lower end 52a thereof. Stepped sections 98, 100 can be defined in an underside of the main body 88 for complementarily fitting over the protuberance 24.

With reference now to FIGS. 7-10 and 13, a neutral locking method for rotating a transmission park release shaft of a vehicle to place a transmission of the vehicle in a neutral state will now be described. In particular, the method will be described in association with the neutral locking system 10 and neutral locking tool 14 described hereinabove though it is to be appreciated that the method could be used with other neutral locking systems and/or neutral locking tools. In one exemplary method, the neutral locking tool 14 is provided as indicated at 110, wherein the neutral locking tool includes the fixture element 50 for positioning over the aperture 22 of the transmission case 20 of the transmission 18 and also includes the rotatable element 52 rotatably received within the fixture element 50.

The method can also include positioning the fixture element 50 over the aperture 22 of the transmission case 20 as indicated at 112. Such positioning of the fixture element 50 can be as described hereinabove with respect to the lower end portion 86 of the fixture element 50 being positioned about the protuberance 24 of the transmission case 20. Also, as facilitated by such positioning, the neutral locking tool 14 can be nonrotatably and removably coupled to the park release shaft 16 as indicated at 114. For example, as shown in FIG. 7, the lower end 52a of the rotatable element 52 can be axially coupled to the park release shaft 16 such that rotation of the rotatable element 52 within the fixture element 50 rotates the park release shaft 16.

Once coupled, the neutral locking tool 14, and more particularly the rotatable element 52, can be rotated to rotate the park release shaft 16. In particular, the rotatable element 52 can be rotated within and relative to the fixture element 50 after nonrotatably and removably coupling the one end (i.e., the lower end 52a) of the rotatable element 52 to the park release shaft 16 to rotate the park release shaft 16 and place the transmission 18 in the neutral state. As described hereinabove, rotation of the rotatable element 52 relative to the fixture element 50 can be limited by receipt of the pin 56 fixably secured to one of the rotatable element 52 and the fixture element 50 (i.e., fixably secured to the fixture element 50 in the illustrated embodiment) within the circumferentially elongated slot 54 defined in the other of the rotatable element 50 and the fixture element 52 (i.e., defined in the fixture element 50 in the illustrated embodiment).

Once in the neutral state, the neutral locking tool 14, and particularly the rotatable element 52 thereof, can be locked in position as described hereinabove with respect to the plunger element 72. In particular, relative rotation between the rotatable element 52 and the fixture element 50 can be locked by radially inserting the plunger element 72 of the fixture element 50 into the radially defined aperture 76 in the rotatable element 52. When desired, such as after completing service on the transmission 18, the plunger element 72 can be retracted against the urging of the spring 74 via the ring member 84 so as to unlock the rotatable element 52 and enable rotation of the neutral locking tool, and particularly the rotatable element 52, back to the first rotatable element position.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A neutral locking system for a vehicle, comprising:
a park release shaft operatively connected to a transmission of the vehicle such that rotation of the park release shaft in a first rotatable direction places the transmission in a neutral state, the park release shaft located adjacent an aperture of a transmission case housing the transmission; and
a neutral locking tool for rotating the park release shaft, the neutral locking tool including:
a fixture element for positioning over the aperture of the transmission case,
a plunger element disposed on the fixture element, the plunger element radially movable between a retracted position wherein relative rotation of the rotatable element is allowed and a locking position wherein the plunger element inhibits relative rotation of the rotatable element, and
a rotatable element rotatably received within the fixture element and having one end configured to nonrotatably and removably couple to the park release shaft such that rotation of the rotatable element within the fixture element rotates the park release shaft, wherein the rotatable element includes an aperture into which the plunger element is received when the plunger element is in the locking position and the rotatable element is rotated to thereby rotate the park release shaft and place the transmission in the neutral state.

2. The neutral locking system of claim 1 wherein the park release shaft is biased in a second rotatable direction that is opposite the first rotatable direction, and wherein rotation of the park release shaft with the neutral locking tool in the first rotatable direction is against said biasing in the second rotatable direction.

3. The neutral locking system of claim 1 wherein cooperative engagement between the rotatable element and the fixture element limits a degree of rotation of the rotatable element relative to the fixture element.

4. The neutral locking system of claim 3 wherein the cooperative engagement between the rotatable element and the fixture element limits rotation of the rotatable element between a first rotatable element position corresponding to the park release shaft being in a normal non-neutral position and a second rotatable element position corresponding to the park release shaft being in a neutral position.

5. The neutral locking system of claim 1 wherein one of the fixture element and the rotatable element defines a circumferentially elongated slot and the other of the fixture element and the rotatable element includes a fixedly secured pin, the pin received in the circumferentially elongated slot to limit rotation of the rotatable element relative to the fixture element.

6. The neutral locking system of claim 5 wherein the fixture element defines the circumferentially elongated slot in a cylindrical sleeve portion and the rotatable element includes the fixedly secured pin, the rotatable element received in the cylindrical sleeve portion with a radial extent of the rotation of the rotatable element relative to the fixture element limited by the circumferentially elongated slot.

7. The neutral locking system of claim 1 wherein rotatable element includes a mating slot adjacent a lower axial end thereof and the park release shaft includes a keyed portion configured for cooperative axial receipt within the mating slot.

8. The neutral locking system of claim 5 wherein the rotatable element includes a tool slot adjacent an upper axial end thereof for receipt of a rotating tool configured to rotate the rotatable element and thereby the park release shaft.

9. The neutral locking system of claim 1 further including:
a spring urging the plunger element toward the locking position wherein the plunger element inserts into the rotatable element to limit rotation of the rotatable element relative to the fixture element.

10. The neutral locking system of claim 1 wherein the park release shaft is a stub shaft that protrudes only slightly from the transmission case and is disposed vertically spaced apart from an upper end of the engine compartment.

11. A neutral locking system for a vehicle, comprising:
a park release shaft operatively connected to a transmission of the vehicle such that rotation of the park release shaft in a first rotatable direction places the transmission in a neutral state, the park release shaft located adjacent an aperture of a transmission case housing the transmission; and
a neutral locking tool for rotating the park release shaft, the neutral locking tool including:
a fixture element for positioning over the aperture of the transmission case, and
a rotatable element rotatably received within the fixture element and having one end configured to nonrotatably and removably couple to the park release shaft such that rotation of the rotatable element within the fixture element rotates the park release shaft,
wherein the park release shaft is a stub shaft that protrudes only slightly from the transmission case and is disposed vertically spaced apart from an upper end of the engine compartment, and
wherein the transmission case includes an upper side with a polygonal shaped portion protruding upward therefrom, an open end of the aperture defined in an upper surface of the polygonal shaped portion, and wherein the fixture element has a lower end portion configured to complementarily fit over and couple with the polygonal shaped portion to axially align the rotatable element with the stub shaft.

12. A neutral locking method for rotating a transmission park release shaft of a vehicle to place a transmission of the vehicle in a neutral state, the method comprising:
providing a neutral locking tool having a fixture element for positioning over an aperture of a transmission case of the transmission and a rotatable element rotatably received within the fixture element;

positioning the fixture element over the aperture of the transmission case; and nonrotatably and removably coupling one end of the rotatable element to the park release shaft such that rotation of the rotatable element within the fixture element rotates the park release shaft wherein the nonrotatably and removably coupling includes axially coupling a lower end of the rotatable element to the park release shaft, wherein the rotatable element includes a mating slot adjacent a lower axial end thereof and the park release shaft includes a keyed portion configured for cooperative axial receipt within the mating slot.

13. The neutral locking method of claim 12 further including:

rotating the rotatable element within and relative to the fixture element after nonrotatably and removably coupling the one end of the rotatable element to the park release shaft to rotate the park release shaft and place the transmission in the neutral state, wherein rotation of the of the rotatable element relative to the fixture element is limited by receipt of a pin fixedly secured to one of the rotatable element and the fixture element within a circumferentially elongated slot defined in the other of the rotatable element and the fixture element.

14. The neutral locking method of claim 13 further including:

locking relative rotation between the rotatable element and the fixture element by radially inserting a plunger element of the fixture element into a radially defined aperture in the rotatable element.

15. The neutral locking system of claim 11 further including:

a plunger element disposed on the fixture element, the plunger element radially movable between a retracted position wherein relative rotation of the rotatable element is allowed and a locking position wherein the plunger element inhibits relative rotation of the rotatable element.

16. The neutral locking system of claim 10 wherein the transmission case includes an upper side with a polygonal shaped portion protruding upward therefrom, an open end of the aperture defined in an upper surface of the polygonal shaped portion, and wherein the fixture element has a lower end portion configured to complementarily fit over and couple with the polygonal shaped portion to axially align the rotatable element with the stub shaft.

17. The neutral locking system of claim 15 further including:

a spring urging the plunger element toward the locking position wherein the plunger element inserts into the rotatable element to limit rotation of the rotatable element relative to the fixture element.

18. The neutral locking system of claim 15 wherein the rotatable element includes an aperture into which the plunger element is received when the plunger element is in the locking position and the rotatable element is rotated to thereby rotate the park release shaft and place the transmission in the neutral state.

* * * * *